United States Patent Office 3,836,600
Patented Sept. 17, 1974

3,836,600
STABILIZED LOW PROFILE RESINS
James L. Brewbaker, Robert M. Nowak, and Kent S. Dennis, Midland, Mich., assignors to The Dow Chemical Company, Midland, Mich.
No Drawing. Filed Feb. 5, 1973, Ser. No. 329,702
Int. Cl. C08f 43/08
U.S. Cl. 260—836    34 Claims

ABSTRACT OF THE DISCLOSURE

Improved stability to low profile thermosettable resin compositions is obtained by the addition thereto of an ethylene oxide block copolymer having the formula $$B_x-CH_2CH_2(OCH_2CH_2)_yOH$$

or $$HO(CH_2CH_2O)_yCH_2CH_2-B_x-CH_2CH_2(OCH_2CH_2)_yOH$$

where B is a block segment of a polymerized alkenylaromatic or conjugated diene monomer.

BACKGROUND OF THE INVENTION

The reinforced plastics industry is entering a period of significant growth and expansion due to new developments in thermosettable resins, thickening agents, low shrink-low profile additives, catalysts, glass reinforcements and the like which have led to unprecedented trade interest in sheet molding compounds (SMC), bulk molding compounds (BMC) and analogous low shrink-low profile sheet molding and bulk molding compounds. The development of thickeners accelerated the interest in SMC and BMC. The advent of low shrink-low profile additives has added additional impetus to this growth because of the numerous advantages in preparing reinforced molded parts with exceptionally smooth surfaces. Previous to these developments, reinforced molded parts had rippled or undulating surfaces which required laborious sanding operations or other corrective measures to obtain painted parts with metal-like appearance.

However, the low shrink-low profile resin systems introduced processing difficulties and other disadvantages. A particularly vexing problem concerns the poor system stability when the low shrink-low profile material is added to the resin. This invention overcomes this stability problem and provides additional benefits and advantages thereby.

The field of this invention relates to thermosettable resin compositions containing certain ethylene oxide block copolymers which provide improved stability to the resin system when formulated to contain additional polymeric modifier materials to improve surface smoothness (low profile or low shrink additives) of the reinforced cured compositions. In particular, the invention concerns unsaturated polyester and vinyl ester resin systems.

SUMMARY OF THE INVENTION

Accordingly, this invention concerns thermosettable resin compositions containing certain ethylene oxide block copolymer stabilizers which provide significant improvements in stability in the presence of certain materials added for the purpose of providing smooth surfaces to reinforced cured articles prepared therefrom.

The block copolymer additives useful with the resin systems herein have the general formula $$B_x-CH_2CH_2(OCH_2CH_2)_yOH$$

or $$HO(CH_2CH_2O)_yCH_2CH_2-B_x-CH_2CH_2(OCH_2CH_2)_yOH$$

where B represents a monoalkenyl aromatic monomer, a conjugated diene monomer or mixtures thereof polymerized into a block segment, $x$ represents the number of monomer units polymerized in said block segment and has a value of at least about 25 and $y$ has a value of at least about 25.

The resins contemplated herein include unsaturated polyester resins and the newer polymerizable vinyl ester resins, e.g., a resin prepared by the reaction of two moles of methacrylic acid with one mole of a diglycidyl ether of bisphenol A, in admixture with at least one copolymerizable monomer such as styrene.

Polymeric additives (low profile or low shrink) to the resins to obtain smooth surfaces include various polydiene rubbers and polyalkenyl aromatic thermoplastic polymers and copolymers.

DESCRIPTION OF THE INVENTION

The incorporation of thermoplastic polymers into thermosettable resins to provide smooth surfaces is now well known. In a paper given in 1970 at the 25th Annual Conference of the Society of the Plastics Industry (SPI) by Nussbaum et al., Section 6E, pages 1–5, "Smooth Surface Premix and Sheet Molding Compound Technology," the use of polystyrene, polyethylene, polymethyl methacrylate and the like in unsaturated polyesters for this purpose is discussed. Resins capable of providing smooth surfaces are also known to the trade as low shrink or low profile resins. Nussbaum et al. points out that the addition of thermoplastics, while providing numerous advantages, also introduce processing difficulties among which is separation of the incompatible thermoplastic and polyester resin after mixing. The above paper also discloses the use of thickening agents such as magnesium oxide in the preparation of sheet molding compounds.

The utility of certain molecular weight polydiene polymers as low profile and impact resistance modifiers for unsaturated polyester and vinyl ester resins is disclosed in U.S. 3,674,893. While the resin systems provide a very desirable combination of properties to reinforced articles, improved stability of the resin system is highly desirable in order to increase the working storage life and improve handleability.

Essential to this invention and to the improved stability of the resin compositions is the addition thereto of an ethylene oxide block copolymer as a stabilizer. The preparation of said block copolymers is described in U.S. 3,050,511 which is incorporated herein by reference. For convenience, said block copolymer will be referred to hereinafter as the "stabilizer" to distinguish it from other polymeric materials which may be present in the resin composition.

More particularly, the stabilizer is a block copolymer having the general formula $$B_x-CH_2CH_2(OCH_2CH_2)_yOH$$

or $$HO(CH_2CH_2O)_yCH_2CH_2-B_x-CH_2CH_2(OCH_2CH_2)_yOH$$

where B, $x$ and $y$ are defined as before. Aromatic monomers useful in making the block segment B are well known and include styrene, vinyl toluene, t-butyl styrene, $\alpha$-methyl styrene, chlorostyrene, bromostyrene and the like. Included within the definition of said aromatic monomers are the various alkyl and halo substituted monomers. Preferably the aromatic monomer is styrene. Conjugated dienes include butadiene, isoprene, chloroprene and the like. Generally dienes having 4 to about 8 carbon atoms are preferred with butadiene being most preferred.

In the general formulas, $x$ is at least about 25 and preferably is an integer such that the hydrocarbon block segment has a molecular weight of at least about 5000 and may have a molecular weight up to 150,000 or greater. The number of oxyethylene units as represented by $y$ in the formula has a value of at least about 25 and preferably at least about 50. The upper value for $y$ may be quite large, e.g. as large as 1000, but there appears to be little value in exceeding about 250 oxyethylene units.

Surprisingly, said block copolymer stabilizer is effective in amounts as low as about 0.01 part per 100 parts of resin and copolymerizable monomer, whereas comparable amounts of well known emulsifiers are ineffective. For example, an ethoxylated nonyl phenol emulsifier having from 40 to 45 oxyethylene units per polyethylene glycol chain actually made the resin system more unstable than the same resin system with no emulsifier. The proportions are critical only to the extent that a sufficient amount be employed to provide the desired stability in the presence of low profile additives. Preferably at least about 0.1 part of said stabilizer is used and generally about 0.1 to 5 parts are sufficient.

Resin systems for which the stabilizer block copolymer is especially useful include an unsaturated polyester resin or a terminally unsaturated vinyl ester resin in admixture with at least one copolymerizable monomer. Generally, the resins are mixed with styrene for thermally cured reinforced articles but for radiation cure other monomers are more preferable such as the hydroxyalkyl acrylates. Mixtures of polyesters and vinyl esters are also contemplated. Generally, the resin comprises from 25 to 70 weight percent of the mixture and the monomer about 30 to 75 weight percent.

Unsaturated polyesters are prepared by a condensation reaction between a polyhydric alcohol and a dicarboxylic acid or anhydride thereof. Said alcohols include ethylene glycol, diethylene glycol, propylene glycol, dipropylene glycol and the like as well as polyalkylene glycols of higher molecular weight. Said acid includes unsaturated acids such as maleic acid, fumaric acid, itaconic acid or the like. Saturated dicarboxylic acids such as phthalic acid, isophthalic acid, tetrabromophthalic acid, chlorendic acid, adipic acid and the like may be used as partial replacement for the unsaturated acids to vary the degree of unsaturation of the polyester resin. The corresponding anhydrides are preferably employed when available.

The glycol or polyhydric alcohol component of the polyester is usually stoichiometric or in slight excess with respect to the sum of the acids. The excess of polyhydric alcohol seldom will exceed 20-25 percent and usually is about 2 to 10 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 5 to 15 hours. Polymerization inhibitors such as t-butyl catechol may be advantageously added. It is also possible to prepare unsaturated polyesters directly from the appropriate oxide by copolymerization with an anhydride, e.g. propylene oxide can be used in place of propylene glycol and copolymerized with maleic anhydride or a mixture of maleic anhydride and phthalic anhydride. Further description of these well known resins is unnecessary herein.

Terminally unsaturated vinyl ester resins are prepared by reacting about equivalent proportions of a polyepoxide resin and an unsaturated monocarboxylic acid wherein

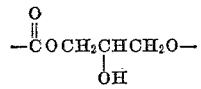

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pats. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as amine, mercaptan, and the like, may be utilized in place of the dicarboxylic acid. All of the above-described resins which contain the characteristic linkages.

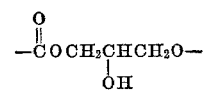

and terminal, polymerizable unsaturated groups, are classified herein as vinyl ester resins. The preparation of vinyl ester resins is fully disclosed in the above patents.

Additionally, it is meant to include within the definition of vinyl ester resins those resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25° to 150° C. is suitable and any of the well known vinyl polymerization inhibitors may be added to prevent polymerization during the reaction.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids cinnamic acid and the like and mixtures thereof, and hydroxyalkyl acrylate or methacrylate half esters, of dicarboxylic acids as described in U.S. Pat. No. 3,367,992 wherein the hydroxyalkyl group preferably has from two to six carbon atoms.

Useful dicarboxylic acid anhydrides to modify the vinyl ester resin include unsaturated anhydrides such as maleic anhydride, citraconic anhydride, itaconic anhydride, the various substituted maleic anhydrides and the like, as well as a variety of saturated anhydrides such as phthalic anhydride, chlorendic anhydride, tetrabromophthalic anhydride and the like.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

The improved stability herein appears to be specific to certain polymeric low profile additives. One group of low profile additives which may be employed are the polyalkenyl aromatic thermoplastics. Typical alkenyl aromatic monomers include styrene, vinyl toluene, t-butyl styrene, α-methyl styrene and the like. Mixtures of said monomers may be used in preparing the polymerized thermoplastic and it is intended herein that the term "polyalkenyl aromatic thermoplastic" include such polymerized mixtures. Polystyrene is a preferred low profile additive.

A second group of low profile additives, which also impart impact resistance, include polydiene rubbers which contain in polymerized form about 30 to 100 weight percent of a conjugated diene or mixtures thereof and correspondingly from 0 to about 70 percent of a monoalkenyl aromatic monomer of the type hereinbefore described. Said polydiene rubbers may be random, graft or block copolymers, all of which are well known as well as methods for their preparation. Many different polydiene rubbers are available commercially.

Conjugated diene monomers include butadiene, isoprene, chloroprene and like monomers, preferably those having 4 to 8 carbon atoms. Butadiene is a preferred monomer, and styrene is a preferred comonomer. Polybutadiene and styrenebutadiene copolymers, especially the block copolymers, are preferred low profile additives. Frequently, mixtures of a polydiene rubber and a polyalkenyl aromatic thermoplastic are preferred, although in the past such mixtures might accentuate the stability problem. Surprisingly, the stabilizers of this invention are unexpectedly effective with said low profile combinations.

To obtain smooth surfaces, it is only necessary to add to the resin-monomer mixture about 5 to 20 parts of said low profile additive per 100 parts of resin-monomer.

The thermosettable compositions herein may be readily cured by exposure to ionizing radiation or by admixture with free radical yielding catalysts such as peroxides, persulfates and the like. With catalysts, the cure may be accelerated by heating up to about 150° C. or higher and also, if desired, by the addition of accelerating agents such as metal napthanates, dimethyl toluidine and the like.

In preparing reinforced articles the thermosettable compositions are usually mixed with glass fibers in any of its various forms such as mats, fabrics, continuous strand, chopped roving and the like. Other reinforcements such as asbestos fibers, nylon fibers, polyester fibers, etc. may also be used.

The resin compositions of this invention are readily prepared by merely combining in any convenient order the desired components and mixing to adequately disperse the low profile additives. Gentle to moderate mixing with mechanical stirrers and mixers is sufficient. High speed, high shear mixing is not required but may be advantageously used, however, in some instances it should be avoided since coagulation may occur. This generally happens with the least stable systems.

The invention will be further illustrated by the following non-limiting examples. All parts and percentages are by weight unless otherwise specified.

Procedures which were used to test stability of the resin compositions were as follows:

A—Room temperature: To determine stability, a resin sample was shaken by hand for 15 seconds and allowed to stand at room temperature. The time was noted when the first visible sign of layer formation appeared in the milky emulsion. Complete separation of the emulsion into two clear layers usually took longer.

B—Stand at 50° C.: The same procedure as in A was followed except that the samples were allowed to stand in an oven at 50° C. This test is an accelerated stability test.

C—Centrifuge: Samples of resins, as in A, were centrifuged in graduated tubes. The ability of various stabilizers were compared by noting the time required for the dividing line between the clear lower layer and the milky emulsified layer to reach a predetermined level.

EXAMPLE 1

A vinyl ester resin, designated herein as Resin A, prepared by reacting about 32 parts of methacrylic acid with 50.4 parts of an epoxy novolac resin (DEN 438) having an epoxide equivalent weight (EEW) of 175–182 and 17.6 parts of a glycidyl polyether of bisphenol A (DER 331) having an EEW of 186–192 was mixed with 43 parts of styrene (30% styrene). A general purpose polystyrene molding resin (Styron 686) was dissolved in styrene to form a 25% solution. Two low profile resin compositions were prepared as follows:

|  | Grams | |
|---|---|---|
|  | I | II |
| Resin A | 8.57 | 8.57 |
| Polystyrene solution (25%) | 8.00 | 8.00 |
| Styrene | 3.43 | 2.93 |
| Stabilizer solution (20%) |  | 0.50 |

The stabilizer solution was a 20% solution in styrene of a 58/200/58 ethylene oxide-styrene-ethylene oxide block copolymer (abbreviated for convenience as EO/S/EO). The numbers refer to the average number of moles in the block segment. The first formulation was stable for about 15 minutes as measured by the room temperature test whereas the second formulation was stable for six days.

EXAMPLE 2

A second vinyl ester resin, designated as Resin B, was prepared by first reacting 172 parts of methacrylic acid with 303 parts of DEN 438 and 56 parts of DER 331 to form a resin similar to that of Example 1 which is subsequently reacted with 90 parts of phthalic anhydride. The resin was then diluted with 312 parts of styrene (33.4% styrene).

The low profile additive in this example was a solution in styrene of polystyrene (12.5%) and a 40:60 styrene/butadiene block copolymer (25.0%). The stabilizer was similar to that used in the first example. Two solutions were prepared as before:

|  | Grams | |
|---|---|---|
|  | I | II |
| Resin B | 13 | 12 |
| Low profile additive solution | 7 | 7 |
| Stabilizer solution (20%) |  | 1 |

Both samples were stirred for 30 seconds on a Hamilton Beach mixer and tested by standing at room temperature. The first composition separated into two layers in five minutes whereas the second formulation showed no separation after five months.

EXAMPLES 3

The effect of the number of moles of ethylene oxide in the stabilizer block copolymer was evaluated in a resin system similar to Example 2. The resin composition contained Resin B/styrene/a 60:40 butadiene-styrene block copolymer/polystyrene/stabilizer in the respective proportions of 30/57.5/8/4.0/0.5. Stability was measured by the centrifuge test:

EO/S/EO stabilizer:

| EO/S/EO stabilizer: | Time to separate to 2.0 ml. mark (min.) |
| --- | --- |
| None | (¹) |
| 22/200/22 | (¹) |
| 58/200/58 | 78 |
| 103/200/103 | 550 |
| 217/200/217 | 150 |

¹ Both emulsions separated on standing in about 5 minutes before centrifuging test was begun.

Following the procedure of Example 3, two additional stabilizers were evaluated.

| Stabilizer | After standing five minutes | Centrifuge, minutes |
| --- | --- | --- |
| None | Separates | |
| 24EO/100 TBS*/24EO | Stable | 15 |
| 93EO/100 S/93EO | do | 35 |

* TBS=t-Butyl styrene.

EXAMPLE 4

The uniqueness of the stabilizers of this invention is shown by the following tests where a number of conventional emulsifiers were evaluated. The resin employed, designated herein as Resin C, is a commercially available propylene glycol-maleic anhydride unsaturated polyester (P-340, Rohm and Haas). The proportions of Resin C/styrene/60:40 butadiene-styrene block copolymer/emulsifier were 39/50.5/10/0.5. Stability was evaluated by standing at room temperature. For comparison purposes results with a stabilizer block copolymer of this invention is also shown.

| Surface active agent | Composition | Time to separate |
| --- | --- | --- |
| None | | 120 minutes. |
| EO/S/EO | 103/200/103 | >3 months. |
| Igepal CO-430 | Nonyl phenol-46EO ethoxylate | 94 minutes. |
| Igepal CO-890 | Nonyl phenol-41EO ethoxylate | 71 minutes. |
| Brij 72 | $C_{18}H_{37}(OCH_2CH_2)_xOH$, $n=2$ | Do. |
| Brij 76 | $C_{18}H_{37}(OCH_2CH_2)_xOH$, $n=10$ | 94 minutes. |
| Brij 78 | $C_{18}H_{37}(OCH_2CH_2)_xOH$, $n=20$ | Do. |
| Pluronic L-121 | $(EO)_x-(PO)_m-(EO)_x$, $n=5, m=15$ | Do. |
| Pluronic L-44 | $(EO)_x-(PO)_m-(EO)_x$, $n=50, m=16$ | 71 minutes. |
| Pluronic P-123 | $(EO)_x-(PO)_m-(EO)_x$, $n=15, m=23$ | 144 minutes. |
| Pluronic F-68 | $(EO)_x-(PO)_m-(EO)_x$, $n=40, m=40$ | 71 minutes. |
| Pluronic F-127 | $(EO)_x-(PO)_m-(EO)_x$, $n=35, m=53$ | 144 minutes. |

It can be seen from the above results that the emulsifiers had very little effect on stability and in fact in most cases the resin compositons were more unstable than the blank or control.

EXAMPLE 5

Three different vinyl ester resins were evaluated under the same conditions and proportions using a 58EO/200S/58EO stabilizer block polymer and both polystyrene and the SB block polydiene of Example 5 as low profile additives. Proportions of resin/styrene/SB block polystyrene/stabilizer were 42.3/44.7/8.7/4.3/0.5.

| Vinyl ester resin | Stabilizer | Time to separate [1] |
| --- | --- | --- |
| Resin A | Present | 4 days. |
| | None | 5 minutes. |
| Resin B | Present | >5 months. |
| | None | 5 minutes. |
| Resin D [2] | Present | 2 months. |
| | None | 5 minutes. |

[1] Stand at room temperature.
[2] Resin prepared by reacting equivalent amounts of methacrylic acid and DER 331.

EXAMPLE 6

The utility of a 103EO/200S/103EO block copolymer stabilizer in a propylene glycol-fumarate unsaturated polyester composition was evaluated with different copolymerizable monomers. Proportions of resin/monomer/polystyrene/stabilizer were 39/50.5/10/0.5. Comparison blanks with no stabilizer present were also run in which the proportions were 39/51/10/0. The resin samples were stirred on a mechanical mixer for 30 seconds, allowed to stand for 1 hour and centrifuged.

| Monomer | Stabilizer | Time to separate standing, min. | Time to separate by centrifuge, min. |
| --- | --- | --- | --- |
| Styrene | Yes | >60 | >120 |
| | No | 10 | <5 |
| Vinyl toluene | Yes | >60 | >120 |
| | No | 90 | <5 |
| Monochlorostyrene | Yes | >60 | >120 |
| | No | 90 | <5 |
| Methyl methacrylate | Yes | >60 | 60 |
| | No | 1 | |
| Vinyl acetate | Yes | >60 | 5 |
| | No | (ª) | |
| 45/55 styrene/VCN | Yes | >60 | 10 |
| | No | (ª) | |

ª Emulsion could not be formed.

Although the emulsion containing vinyl acetate or acrylonitrile (VCN) were not as stable with the stabilizer present as the other examples, without the stabilizer an emulsion could not even be formed.

EXAMPLE 7

Various block copolymer stabilizers were evaluated by all three stability tests with Resin A/styrene/the SB block copolymer of Example 4/polystyrene/stabilizer in proportions of 30/56.5/8.7/4.3/0.5 for the centrifuge and 50° C. tests and 30/57.5/8/4/0.5 for the room temperature tests. The results are shown below.

| Block copolymer stabilizer | Room temperature stability | 50° C. stability, min. | Centrifuge stability, min. |
| --- | --- | --- | --- |
| None | 5-10 minutes | 3-5 | 2 |
| EO/S/EO (56/100/56) | >16 hours | 40 | 23 |
| EO/S/EO (93/100/93) | 6 days | 65 | 35 |
| EO/S/EO (144/100/144) | 23 days | 90 | 77 |
| EO/S/EO (58/200/58) | do | 420 | 78 |
| EO/S/EO (217/200/217) | | 420 | 90 |
| EO/S/EO (116/400/116) | | 420 | |
| EO/S (55/125) | 8 days | | |
| EO/B*/EO (123/200/123) | 17 hours | | |

*B=Butadiene.

EXAMPLE 8

Two additional unsaturated polyesters were evaluated for stability with and without a 58EO/200S/58EO block copolymer stabilizer. The proportions of resin/styrene/polystyrene/stabilizer were 42/47.5/10/0.5. Room temperature stability was evaluated. Resin E was a commercially available polyester prepared from propylene glycol and a mixture of maleic and o-phthalic anhydride (85/15) and Resin F was a polyester prepared from a mixture of propylene and dipropylene glycols (68/32) and a mixture of maleic anhydride, isophthalic anhydride and benzoic acid (75/23/2).

| Resin | Stabilizer | Stability |
|---|---|---|
| Resin E | Yes | 8 days. |
|  | No | <13 hours. |
| Resin F | Yes | 8 days. |
|  | No | <13 hours. |
| Resin C* | Yes | ~4 months. |
|  | No | 2 hours. |

*Proportions were 39/53./5/30/3.5.

EXAMPLE 9

Using Resin A and a 58EO/200S/58/EO block copolymer stabilizer, a number of low profile additives were tested for room temperature stability. Proportions of resin/styrene/additive/stabilizer were 30/59.5/10/0.5.

| Low profile additive | Time to separate Blank | With stabilizer |
|---|---|---|
| Polybutadiene | 15 minutes | 22 hours. |
| Polybutadiene (Philprene 1995CD) | do | 6 days. |
| Polybutadiene (Solprene 203) | 5 minutes | 5 hours. |
| 50/50 B/S block* (Solprene 303) | do | 6 days. |
| 60/40 B/S block* (Solprene 409) | 15 minutes | Do. |
| 70/30 B/S block* | do | 75 days. |
| 75/25 B/S block* (Solprene 1205) | 5 minutes | 6 days. |
| 75/45 B/S block* (Solprene 1206) | do | 5 hours. |
| 20/60/20 S/B/S block (Thermoplastic 125-5000 | 15 minutes | 75 days. |
| Polystyrene (Styron 686) | do | 6 days. |
| High impact polystyrene (Styron 492) | do | Do. |
| Polymonochlorostyrene | 1 hour | 75 days. |
| Polyvinyltoluene | 15 minutes | Do. |

* B=Butadiene; S=Styrene.

EXAMPLE 10

Similar to Example 9, the low profile additives were evaluated with an unsaturated polyester, Resin C, using the respective proportions of 39/51.5/10/0.5.

| Low profile additive | Time to separate Blank | With stabilizer |
|---|---|---|
| Polybutadiene | 1 hour | >6 days. |
| Polybutadiene (Philprene 1995 CD) | 3 hours | 7 hours. |
| Polybutadiene (Solprene 203) | 5 minutes | 5 minutes. |
| 50/50 B/S block | 3 hours | 24 hours. |
| 60/40 B/S block | 1 hour | 13 days. |
| 70/30 B/S block | do | 6 days. |
| 20/60/20 S/B/S block | 7 hours | 10 days. |
| Polystyrene | 3 hours | >10 days. |
| High impact polystyrene | do | >10 days. |
| Polymonochlorostyrene | 7 hours | >10 days. |

EXAMPLE 11

Similar to Example 10, tests were made with a propylene glycol-fumarate polyester/styrene/rubber/stabilizer in the proportions of 39/51/10/0.5.

| Low profile additive | Time to separate Blank, minutes | With stabilizer, days |
|---|---|---|
| 60/50 B/S block | 10 | a 6 |
| 77/43 B/S random | 1 | b >7 |
| Polybutadiene | 15 | b >11 |
| Polybutadiene (Philprene 1995 (CD) | 15 | b >11 |
| Polybutadiene (Solprene) | (c) | b 4 | a Stabilizer was 103EO/200 S/103EO.
b Stabilizer was 143EO/200 B/143EO.
c Emulsion did not form.

EXAMPLE 12

The effect of stabilizer concentration was evaluated with Resin A and a 93EO/100S/93EO block copolymer stabilizer. The composition contained Resin A/styrene/60:40 BS block/polystyrene in the proportions of 30/57/8.7/4.3. Varying parts of stabilizer were added and room temperature stability measured.

| Parts of stabilizer: | Time to separate |
|---|---|
| 0 | 5 min. |
| 0.25 | >16 hours. |
| 0.50 | 3 weeks. |
| 1.0 | ~5 weeks. |

The stability is seen to improve as the concentration of the block copolymer stabilizer increases. While larger amounts may be used, it can be seen that small amounts of the stabilizer are very effective.

EXAMPLE 13

With proportions of Resin A/styrene/stabilizer of 30/69.5/0.5 the effect of various amounts of polystyrene on stability were measured. For each part of polystyrene used the parts of styrene were decreased correspondingly. The stabilizer was a 217EO/200S/217EO block copolymer.

| Parts of polystyrene | Time to 25% separation by centrifuge, minutes | Resin viscosity, cps. |
|---|---|---|
| 4.3 | 6 | 52 |
| 7.0 | 75 | 132 |
| 11.0 | 160 | 412 |
| 15.0 | 192 | 932 |

EXAMPLE 14

Using the vinyl ester resin of Example 2 (Resin B) room temperature stability tests were made with varying amounts of a 103EO/200S/103EO stabilizer. The proportions of resin/styrene/60:40 B:S block were 40/50/10.

| Stabilizer p.p.h.: | Emulsion stability |
|---|---|
| 0 | <1 min.[1] |
| 0.01 | 11 min. |
| 0.025 | 15 min. |
| 0.050 | 30 min. |
| 0.1 | 5.5 hrs. |
| 0.3 | 3 days. |
| 0.5 | Do. |

[1] Stable emulsion did not form.

Similar tests were made using a propylene glycol-fumarate resin in place of Resin B with respective proportions of 39/51/10.

| Stabilizer p.p.h.: | Emulsion stability |
|---|---|
| 0 | <1 min.[1] |
| 0.05 | 12 min. |
| 0.1 | 51 min. |
| 0.3 | 2 days. |
| 0.5 | Do. |

[1] Stable emulsion did not form.

What is claimed is:

1. A thermosettable composition comprising a mixture of (a) an unsaturated polyester of a polycarboxylic acid and a polyol, a terminally unsaturated vinyl ester resin comprising the reaction product of a polyepoxide having more than one epoxide group per molecule with an unsaturated monocarboxylic acid or mixtures thereof, (b) at least one vinyl monomer copolymerizable therewith, and (c) a block copolymer stabilizer in an amount sufficient to provide stability to a mixture of said composition and a polymeric low profile additive, wherein said stabilizer is a block copolymer having the formula $$B_x\text{---}CH_2CH_2(OCH_2CH_2)_yOH$$

or $$HO(CH_2CH_2O)_yCH_2CH_2\text{---}B_x\text{---}CH_2CH_2(OCH_2CH_2)_yOH$$

where B is a repeating unit of a monoalkenyl aromatic monomer, a conjugated diene monomer or mixtures thereof polymerized into a block segment, $x$ has a value of at least about 25 and $y$ has a value of at least about 25.

2. The composition of Claim 1 comprising at least about 0.1 part of said stabilizer.

3. The composition of Claim 2 where $y$ is at least about 50 and wherein the block segment of B monomers has a molecular weight of at least about 5000.

4. The composition of Claim 3 where $y$ has a value of about 50 to 250.

5. The composition of Claim 3 wherein said resin is a vinyl ester resin.

6. The composition of Claim 3 wherein said resin is an unsaturated polyester resin.

7. The composition of Claim 3 comprising about 0.1 to 5 parts of said stabilizer.

8. In a process for preparing low profile thermosettable compositions where about 5 to 20 parts of a low profile polymeric additive is added to 100 parts of a mixture of (a) an unsaturated polyester of a polycarboxylic acid and a polyol, a terminally unsaturated vinyl ester resin comprising the reaction product of a polyepoxide having more than one epoxide group per molecule with an unsaturated monocarboxylic acid or mixtures thereof and (b) at least one vinyl monomer copolymerizable therewith, where said low profile additive is a polyalkenyl aromatic thermoplastic, a polydiene rubber which contains in polymerized form about 30 to 100 weight percent of a conjugated diene or mixtures thereof and correspondingly from 0 to about 70 weight percent of at least one monoalkenyl aromatic monomer, or mixtures of said rubber and thermoplastic, the improvement which comprises adding thereto a block copolymer stabilizer in an amount sufficient to a stabilize said low profile composition, wherein said stabilizer is a block copolymer having the formula

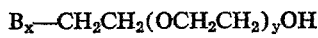

or

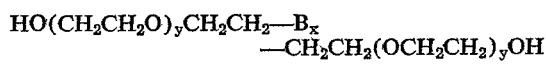

where B is a repeating unit of a monoalkenyl aromatic monomer, a conjugated diene monomer or mixtures thereof polymerized into a block segment, $x$ has a value of at least about 25 and $y$ has a value of at least about 25.

9. The process of Claim 8 comprising the addition of at least 0.1 part of said stabilizer.

10. The process of Claim 9 wherein the stabilizer block segment of B monomers has a molecular weight of at least about 5000 and $y$ is at least about 50.

11. The process of Claim 10 where $y$ has a value of about 50 to 250.

12. The process of Claim 10 where the resin is a vinyl ester resin.

13. The process of Claim 10 where the resin is an unsaturated polyester.

14. The process of Claim 10 comprising the addition of about 0.1 to 5 parts of said stabilizer.

15. The process of Claim 10 wherein said thermoplastic is polystyrene.

16. The process of Claim 10 wherein said rubber is polybutadiene.

17. The process of Claim 10 wherein said rubber is a block copolymer.

18. The process of Claim 17 wherein said copolymer is a block copolymer of styrene and butadiene.

19. The process of Claim 10 wherein said low profile additive is a mixture of said thermoplastic and a block copolymer rubber.

20. In a thermosettable low profile composition comprising a mixture of (a) an unsaturated polyester of a polycarboxylic acid and a polyol, a terminally unsaturated vinyl ester resin comprising the reaction product of a polyepoxide having more than one epoxide group per molecule with an unsaturated monocarboxylic acid or mixtures thereof, (b) at least one vinyl monomer copolymerizable therewith, (c) about 5 to 20 parts of a polymeric low profile additive per 100 parts of (a) and (b) where said low profile additive is a polyalkenyl aromatic thermoplastic, a polydiene rubber which contains in polymerized form about 30 to 100 weight percent of a conjugated diene or mixtures thereof and correspondingly from 0 to about 70 weight percent of at least one monoalkenyl aromatic monomer, or mixtures of said rubber and thermoplastic, and (d) a block copolymer stabilizer in an amount sufficient to stabilize same wherein said stabilizer is a block copolymer having the formula

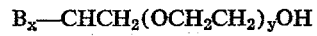

or

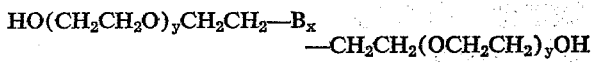

where B is repeating unit of a monoalkenyl aromatic, a conjugated diene monomer or mixtures thereof polymerized into a block segment, $x$ has a value of at least about 25 and $y$ has a value of at least about 25.

21. The composition of Claim 20 comprising the addition of at least 0.1 part of said stabilizer.

22. The composition of Claim 21 wherein the stabilizer block segment of B monomers has a molecular weight of at least about 5000 and $y$ is at least about 50.

23. The composition of Claim 22 where $y$ has a value of about 50 to 250.

24. The composition of Claim 22 where the resin is a vinyl ester resin.

25. The composition of Claim 22 where the resin is an unsaturated polyester.

26. The composition of Claim 22 comprising the addition of about 0.1 to 5 parts of said stabilizer.

27. The composition of Claim 22 wherein said thermoplastic is polystyrene.

28. The composition of Claim 22 wherein said rubber is polybutadiene.

29. The composition of Claim 22 wherein said rubber is a block copolymer.

30. The composition of Claim 29 wherein said copolymer is a block copolymer of styrene and butadiene.

31. The composition of Claim 22 wherein said low profile additive is a mixture of said thermoplastic and a block copolymer rubber.

32. The composition of Claim 5 wherein said vinyl ester resin is further reacted with a dicarboxylic acid anhydride.

33. The composition of Claim 12 wherein said vinyl ester is further reacted with a dicarboxylic acid anhydride.

34. The composition of Claim 24 wherein said vinyl ester resin is further reacted with a dicarboxylic acid anhydride.

References Cited

UNITED STATES PATENTS

| | | | |
|---|---|---|---|
| 3,050,511 | 8/1962 | Szwarc | 260—93.5 |
| 3,231,634 | 1/1966 | Wismer et al. | 260—862 |
| 3,377,406 | 4/1968 | Newey et al. | 260—837 |
| 3,642,683 | 2/1972 | Fry | 260—31.6 |
| 3,674,893 | 7/1972 | Nowack et al. | 260—836 |
| 3,705,208 | 12/1972 | Nakamuta et al. | 260—861 |

WILLIAM H. SHORT, Primary Examiner

E. A. NIELSEN, Assistant Examiner

U.S. Cl. X.R.

260—40 R, 837 R, 862, 874

PO-1050
(5/69)

UNITED STATES PATENT OFFICE
CERTIFICATE OF CORRECTION

Patent No. 3,836,600      Dated September 17, 1974

Inventor(s) James L. Brewbaker, Robert M. Nowak and Kent S. Dennis

It is certified that error appears in the above-identified patent and that said Letters Patent are hereby corrected as shown below:

Column 4, line 71, after the word "acids", and before the word "cinnamic", insert a comma.

Column 6, line 56, the word "anhvdride" should be --anhydride--.

Column 7, lines 55-60, in the last five lines of the Table, the symbol sub "x" should be sub --n--. The correct form is reproduced below:

Pluronic L-121....$(EO)_n-(PO)_m-(EO)_{n'}$

Pluronic L-44....$(EO)_{n \atop 16}-(PO)_m-(EO)_{n'}$

Pluronic F-123...$(EO)_{n \atop 23}(PO)_m-(EO)_{n'}$

Pluronic F-68....$(EO)_{n \atop 40}-(PO)_m-(EO)_{n'}$

Pluronic F-127...$(EO)_{n \atop 53}-(PO)_m-(EO)_{n'}$

Column 9, line 9, the asterisk definition should read --*Proportions were 39/50.5/10/0.5--.

Column 9, line 26, the figure "75/45" should read --75/25--.

Column 9, line 67, under footnote b, should read -- Stabilizer was 123E0/200 B/123E0 --.

Column 12, line 19, the formula should have a sub 2 after the first occurrence of CH so that it reads:

$$--B_x-CH_2CH_2(OCH_2CH_2)_yOH--.$$

Signed and sealed this 28th day of January 1975.

(SEAL)
Attest:

McCOY M. GIBSON JR.
Attesting Officer

C. MARSHALL DANN
Commissioner of Patents